US012581343B2

(12) United States Patent
Chen et al.

(10) Patent No.: US 12,581,343 B2
(45) Date of Patent: Mar. 17, 2026

(54) MEASUREMENT METHOD, INFORMATION ACQUISITION METHOD, INFORMATION SENDING METHOD, TERMINAL AND NETWORK-SIDE EQUIPMENT

(71) Applicants: China Mobile Communication Co., Ltd Research Institute, Beijing (CN); China Mobile Communications Group Co., Ltd., Beijing (CN)

(72) Inventors: Jingjing Chen, Beijing (CN); Xiaoran Zhang, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 422 days.

(21) Appl. No.: 18/040,683

(22) PCT Filed: Aug. 6, 2021

(86) PCT No.: PCT/CN2021/111218
§ 371 (c)(1),
(2) Date: Feb. 6, 2023

(87) PCT Pub. No.: WO2022/028582
PCT Pub. Date: Feb. 10, 2022

(65) Prior Publication Data
US 2023/0284061 A1 Sep. 7, 2023

(30) Foreign Application Priority Data
Aug. 6, 2020 (CN) .......................... 202010782387.6

(51) Int. Cl.
H04L 5/00 (2006.01)
H04B 17/20 (2015.01)
(Continued)

(52) U.S. Cl.
CPC .......... *H04W 24/10* (2013.01); *H04B 17/254* (2023.05); *H04B 17/364* (2015.01);
(Continued)

(58) Field of Classification Search
CPC .... H04B 17/0082–3913; H04J 11/0023–0093; H04J 2011/0003–0096;
(Continued)

(56) References Cited

U.S. PATENT DOCUMENTS

2013/0215772 A1* 8/2013 Kaur ..................... H04W 24/10
2018/0262313 A1 9/2018 Nam et al.
(Continued)

FOREIGN PATENT DOCUMENTS

CN 103391575 A 11/2013
CN 110062413 A 7/2019
(Continued)

OTHER PUBLICATIONS

Huawei, Hisilicon, "Discussion on CSI-RS based L3 measurement requirements and scheduling restriction", 3GPP TSG-RAN WG4 Meeting #94-e, R4-2001658, Online, Feb. 24-Mar. 6, 2020 (Year: 2020).*
(Continued)

*Primary Examiner* — Timothy J Weidner
(74) *Attorney, Agent, or Firm* — Price Heneveld LLP

(57) ABSTRACT
A measurement method, an information acquisition method, an information sending method, a terminal, and a network-side equipment are provided. The measurement method includes: determining measurement requirements, according to at least one of information related to a receiving time of a Channel State Information-Reference Signal (CSI-RS), information related to a Fast Fourier Transform (FFT), information related to a measurement of a Synchronization
(Continued)

determining measurement requirements, according to at least one of information related to a receiving time of a CSI-RS, information related to a FFT, information related to a measurement of an SSB and a CSI-RS and information related to a minimum interval of a CSI-RS

11

Signal Block (SSB) and a CSI-RS and information related to a minimum interval of a CSI-RS.

7 Claims, 3 Drawing Sheets

(51) Int. Cl.

| | |
|---|---|
| *H04B 17/364* | (2015.01) |
| *H04W 24/08* | (2009.01) |
| *H04W 24/10* | (2009.01) |
| *H04W 56/00* | (2009.01) |
| *H04W 84/02* | (2009.01) |
| *H04W 88/02* | (2009.01) |
| *H04W 88/08* | (2009.01) |
| *H04W 92/02* | (2009.01) |
| *H04W 92/10* | (2009.01) |

(52) U.S. Cl.
CPC .......... *H04L 5/0051* (2013.01); *H04L 5/0087* (2013.01); *H04W 24/08* (2013.01); *H04W 56/0015* (2013.01); *H04W 56/003* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
CPC ............ H04L 5/0001–0098; H04W 8/22–245; H04W 24/02–10; H04W 36/0005–385; H04W 56/0005–0095; H04W 72/02–569; H04W 84/02–16; H04W 88/02–12; H04W 92/02–04; H04W 92/10
See application file for complete search history.

(56) References Cited

U.S. PATENT DOCUMENTS

| | | | |
|---|---|---|---|
| 2019/0166513 A1 | 5/2019 | Lin | |
| 2021/0168744 A1 | 6/2021 | Matsumura et al. | |
| 2021/0176656 A1 | 6/2021 | Sang et al. | |
| 2021/0219154 A1 | 7/2021 | Han et al. | |
| 2021/0345191 A1* | 11/2021 | Da Silva ............... | H04W 24/10 |

FOREIGN PATENT DOCUMENTS

| | | |
|---|---|---|
| CN | 110100492 A | 8/2019 |
| CN | 110574328 A | 12/2019 |
| CN | 110913422 A | 3/2020 |
| CN | 111418226 A | 7/2020 |
| WO | 2019233119 A1 | 12/2019 |
| WO | 2020031388 A1 | 2/2020 |

OTHER PUBLICATIONS

Huawei, Hisilicon, "Discussion on CSI-RS measurement bandwidth", 3GPP TSG-RAN WG4 Meeting AH-1801, R4-1800661, Jan. 22-26, 2018, San Diego, USA.

Intel Corporation, "Discussion about CSI-RS based L3 measurement", 3GPP TSG-RAN WG4 Meeting #92bis, R4-1911023, Oct. 14-18, 2019, Chongqing, China.

Huawei, Hisilicon, On synchronization assumption for CSI-RS measurement requirements, 3GPP TSG-Ran WG4 Meeting #94bis-e, R4-2004375, Apr. 20-30, 2020, Electronic Meeting.

OPPO, [CATT], "WF on CSI-RS based L3 measurement capability and requirements", 3GPP TSG-RAN4 WG4 Meeting #95e, R4-2009009, May 25-Jun. 5, 2020, Electronic Meeting.

Huawei, Hisilicon, "Discussion on CSI-RS based L3 measurement requirements and scheduling restriction", 3GPP TSG-RAN WG4 Meeting #94-e, R4-2001658, Online, Feb. 24-Mar. 6, 2020.

* cited by examiner determining measurement requirements, according to at least one of information related to a receiving time of a CSI-RS, information related to a FFT, information related to a measurement of an SSB and a CSI-RS and information related to a minimum interval of a CSI-RS

Figures 1, 2, 3, 4:
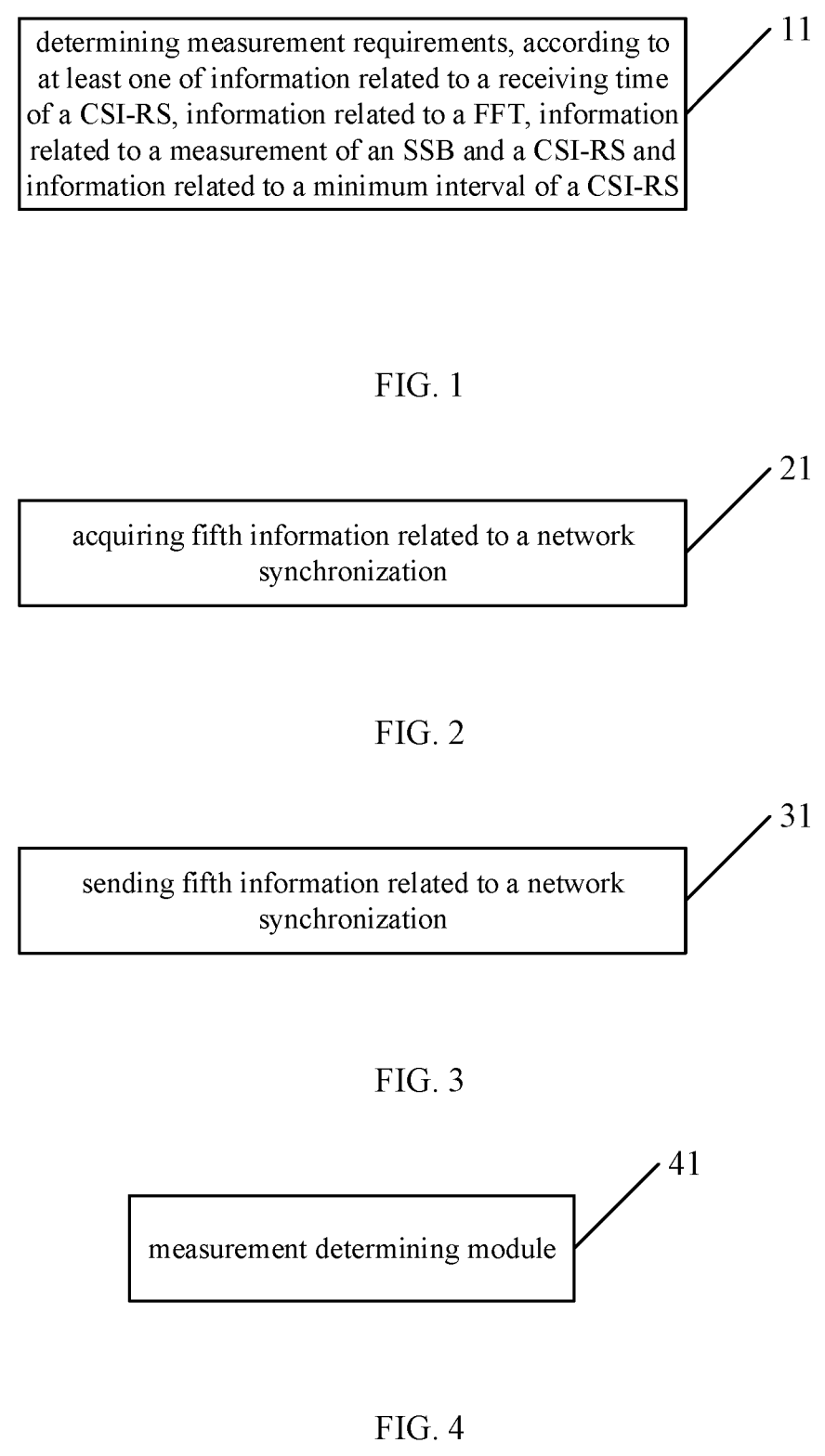

11

FIG. 1 acquiring fifth information related to a network synchronization

21

FIG. 2 sending fifth information related to a network synchronization

31

FIG. 3 measurement determining module

MEASUREMENT METHOD, INFORMATION ACQUISITION METHOD, INFORMATION SENDING METHOD, TERMINAL AND NETWORK-SIDE EQUIPMENT

The present disclosure is the U.S. national phase of PCT Application PCT/CN2021/111218 filed on Aug. 6, 2021, which claims a priority of Chinese patent application No. 202010782387.6 filed on Aug. 6, 2020, which is incorporated herein by reference in its entirety.

The present disclosure claims a priority of Chinese patent application No. 202010782387.6 filed on Aug. 6, 2020, which is incorporated herein by reference in its entirety.

TECHNICAL FIELD

The present disclosure relates to the field of communications technologies, and in particular, to a measurement method, an information acquisition method, an information sending method, a terminal, and a network-side equipment.

BACKGROUND

Based on L3 measurement of a Channel State Information-Reference Signal (CSI-RS), since a CSI-RS configuration for L3 measurement is very flexible and has various configurations, which relate to bandwidth, density, number of beams, and the like, a terminal has various design schemes for CSI-RS L3 measurement from the viewpoint of saving cost and power consumption. For example, some terminals can perform CSI-RS measurement only based on 1 Fast Fourier Transform (FFT), and some terminals can support multiple FFTs. For another example, some terminals use the same set of search tools (baseband processing capabilities) to perform SSB (Synchronization Signal Block) based measurements and CSI-RS based measurements, and some terminals may support independent search tools to perform SSB and CSI-RS based measurements, respectively.

In the related art, although different terminals have different CSI-RS measurement designs and different behaviors of the terminal, currently, a network deploys the same set of measurement requirement(s) (such as measurement delay, measurement accuracy, and the like) for all terminals in the network, so that the terminals have different measurement performances when performing CSI-RS measurement, thereby affecting the system performance of the network.

SUMMARY

The embodiments of the present disclosure provide a measurement method, an information acquisition method, an information sending method, a terminal, and a network-side equipment, so as to solve the problem that in the related art, since all terminals deploy the same set of measurement requirement(s), measurement performances are different and network system performance is affected.

In order to solve the above problem, an embodiment of the present disclosure provides a measurement method, applied to a terminal and including:

determining a measurement requirement(s), according to at least one of information related to a receiving time of a Channel State Information-Reference Signal (CSI-RS), information related to a Fast Fourier Transform (FFT), information related to a measurement of a Synchronization Signal Block (SSB) and a CSI-RS and information related to a minimum interval of a CSI-RS.

Optionally, the method further includes at least one of:

reporting first information, where the first information is information related to the receiving time of the CSI-RS;

reporting second information, where the second information is information related to the FFT;

reporting third information, where the third information is information related to the measurement of the SSB and the CSI-RS; and reporting fourth information, where the fourth information is information related to the minimum interval of the CSI-RS.

Optionally, the information related to the receiving time of the CSI-RS includes at least one of:

whether a receiving time difference or an arriving time difference of the CSI-RS is smaller than or equal to a first threshold;

whether a maximum value of the receiving time difference or the arriving time difference of the CSI-RS is smaller than or equal to a second threshold;

whether the terminal supports a reception or a measurement of a second cell CSI-RS performed based on a timing of a first cell;

whether the terminal supports a reception or a measurement of the CSI-RS performed based on a timing of a third cell;

whether the terminal supports a reception or a measurement of the CSI-RS performed based on a timing of an associated SSB; and whether the terminal supports a reception or a measurement of a CSI-RS of a first frequency point or a first carrier performed based on a single timing.

Optionally, the information related to the FFT includes at least one of:

whether the terminal supports 2 FFTs or more than 2 FFTs;

a quantity of FFTs supported by the terminal.

Optionally, the information related to the measurement of the SSB and the CSI-RS includes at least one of:

whether the terminal supports simultaneously measuring the SSB and the CSI-RS;

whether the terminal supports independent processing modules to respectively measure the SSB and the CSI-RS;

whether the terminal supports a dedicated processing module to measure the CSI-RS.

Optionally, the information related to the minimum interval of the CSI-RS includes at least one of:

a quantity of symbols spaced between CSI-RS resources of two consecutive slots;

a quantity of slots spaced between two consecutive slots in which the CSI-RS is transmitted.

Optionally, the method further includes at least one of:

applying a first measurement requirement(s), when the receiving time difference or the arriving time difference of the CSI-RS is smaller than or equal to a first threshold;

applying a second measurement requirement(s), when the receiving time difference or the arriving time difference of the CSI-RS is larger than or equal to a first threshold;

applying a first measurement requirement(s), when the maximum value of the receiving time difference or the arriving time difference of the CSI-RS is smaller than or equal to a second threshold;

applying a second measurement requirement(s), when the maximum value of the receiving time difference or the arriving time difference of the CSI-RS is larger than a second threshold;

applying a first measurement requirement(s), when the terminal supports the reception or the measurement of the second cell CSI-RS performed based on the timing of the first cell;

applying a second measurement requirement(s), when the terminal does not support the reception or the measurement of the second cell CSI-RS performed based on the timing of the first cell;

applying a first measurement requirement(s), when the terminal supports the reception or the measurement of the CSI-RS performed based on the timing of the third cell;

applying a second measurement requirement(s), when the terminal does not support the reception or the measurement of the CSI-RS performed based on the timing of the third cell;

applying a first measurement requirement(s), when the terminal supports the reception or the measurement of the CSI-RS performed based on the timing of the associated SSB;

applying a second measurement requirement(s), when the terminal does not support the reception or the measurement of the CSI-RS performed based on the timing of the associated SSB;

applying a first measurement requirement(s), when the terminal supports the reception or the measurement of the CSI-RS of the first frequency point or the first carrier performed based on the single timing; and applying a second measurement requirement(s), when the terminal does not support the reception or the measurement of the CSI-RS of the first frequency point or the first carrier performed based on the single timing.

Optionally, the method further includes at least one of:

applying a first measurement requirement(s), when the terminal supports 2 FFTs or more than 2 FFTs;

applying a second measurement requirement(s), when the terminal does not support 2 FFTs or more than 2 FFTs;

applying a first measurement requirement(s), when a quantity of FFTs supported by the terminal is greater than or equal to 2; and applying a second measurement requirement(s), when a quantity of FFTs supported by the terminal is less than 2.

Optionally, the method further includes at least one of:

applying a first measurement requirement(s), when the terminal supports simultaneously measuring the SSB and the CSI-RS;

applying a second measurement requirement(s), when the terminal does not support simultaneously measuring the SSB and the CSI-RS;

applying a first measurement requirement(s), when the terminal supports independent processing modules to respectively measure the SSB and the CSI-RS;

applying a second measurement requirement(s), when the terminal does not support independent processing modules to respectively measure the SSB and the CSI-RS;

applying a first measurement requirement(s), when the terminal supports the dedicated processing module to measure the CSI-RS; and applying a second measurement requirement(s), when the terminal does not support the dedicated processing module to measure the CSI-RS.

An information acquisition method is further provided in the present disclosure, applied to a terminal and including:

acquiring fifth information related to a network synchronization.

Optionally, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

Optionally, the third threshold and/or the fourth threshold is: any value greater than or equal to 0, or a cyclic prefix, or a cyclic prefix/N; where N is an integer greater than or equal to 2.

An information sending method is further provided in the present disclosure, applied to a network-side equipment and including:

sending fifth information related to a network synchronization.

Optionally, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

Optionally, the third threshold and/or the fourth threshold is: any value greater than or equal to 0, or a cyclic prefix, or a cyclic prefix/N; where N is an integer greater than or equal to 2.

A measuring device is further provided in the present disclosure, applied to a terminal and including:

a measurement determining module, configured to determine a measurement requirement(s), according to at least one of information related to a receiving time of a Channel State Information-Reference Signal (CSI-RS), information related to a Fast Fourier Transform (FFT), information related to a measurement of a Synchronization Signal Block (SSB) and a CSI-RS and information related to a minimum interval of a CSI-RS.

A terminal is further provided in the present disclosure, including a processor and a transceiver, where the transceiver is configured to receive and transmit data under a control of the processor, the processor is configured to perform:

determining a measurement requirement(s), according to at least one of information related to a receiving time of a Channel State Information-Reference Signal (CSI-RS), information related to a Fast Fourier Transform (FFT), information related to a measurement of a Synchronization Signal Block (SSB) and a CSI-RS and information related to a minimum interval of a CSI-RS.

Optionally, the processor is further configured to perform at least one of:

reporting first information, where the first information is information related to the receiving time of the CSI-RS;

reporting second information, where the second information is information related to the FFT;

reporting third information, where the third information is information related to the measurement of the SSB and the CSI-RS; and reporting fourth information, where the fourth information is information related to the minimum interval of the CSI-RS.

Optionally, the information related to the receiving time of the CSI-RS includes at least one of:

whether a receiving time difference or an arriving time difference of the CSI-RS is smaller than or equal to a first threshold;

whether a maximum value of the receiving time difference or the arriving time difference of the CSI-RS is smaller than or equal to a second threshold;

whether the terminal supports a reception or a measurement of a second cell CSI-RS performed based on a timing of a first cell;

whether the terminal supports a reception or a measurement of the CSI-RS performed based on a timing of a third cell;

whether the terminal supports a reception or a measurement of the CSI-RS performed based on a timing of an associated SSB; and whether the terminal supports a reception or a measurement of a CSI-RS of a first frequency point or a first carrier performed based on a single timing.

Optionally, the information related to the FFT includes at least one of:

whether the terminal supports 2 FFTs or more than 2 FFTs;

a quantity of FFTs supported by the terminal.

Optionally, the information related to the measurement of the SSB and the CSI-RS includes at least one of:

whether the terminal supports simultaneously measuring the SSB and the CSI-RS;

whether the terminal supports independent processing modules to respectively measure the SSB and the CSI-RS;

whether the terminal supports a dedicated processing module to measure the CSI-RS.

Optionally, the information related to the minimum interval of the CSI-RS includes at least one of:

a quantity of symbols spaced between CSI-RS resources of two consecutive slots;

a quantity of slots spaced between two consecutive slots in which the CSI-RS is transmitted.

Optionally, the processor is further configured to perform at least one of:

applying a first measurement requirement(s), when the receiving time difference or the arriving time difference of the CSI-RS is smaller than or equal to a first threshold;

applying a second measurement requirement(s), when the receiving time difference or the arriving time difference of the CSI-RS is larger than or equal to a first threshold;

applying a first measurement requirement(s), when the maximum value of the receiving time difference or the arriving time difference of the CSI-RS is smaller than or equal to a second threshold;

applying a second measurement requirement(s), when the maximum value of the receiving time difference or the arriving time difference of the CSI-RS is larger than a second threshold;

applying a first measurement requirement(s), when the terminal supports the reception or the measurement of the second cell CSI-RS performed based on the timing of the first cell;

applying a second measurement requirement(s), when the terminal does not support the reception or the measurement of the second cell CSI-RS performed based on the timing of the first cell;

applying a first measurement requirement(s), when the terminal supports the reception or the measurement of the CSI-RS performed based on the timing of the third cell;

applying a second measurement requirement(s), when the terminal does not support the reception or the measurement of the CSI-RS performed based on the timing of the third cell;

applying a first measurement requirement(s), when the terminal supports the reception or the measurement of the CSI-RS performed based on the timing of the associated SSB;

applying a second measurement requirement(s), when the terminal does not support the reception or the measurement of the CSI-RS performed based on the timing of the associated SSB;

applying a first measurement requirement(s), when the terminal supports the reception or the measurement of the CSI-RS of the first frequency point or the first carrier performed based on the single timing; and applying a second measurement requirement(s), when the terminal does not support the reception or the measurement of the CSI-RS of the first frequency point or the first carrier performed based on the single timing.

Optionally, the processor is further configured to perform at least one of:

applying a first measurement requirement(s), when the terminal supports 2 FFTs or more than 2 FFTs;

applying a second measurement requirement(s), when the terminal does not support 2 FFTs or more than 2 FFTs;

applying a first measurement requirement(s), when a quantity of FFTs supported by the terminal is greater than or equal to 2; and applying a second measurement requirement(s), when a quantity of FFTs supported by the terminal is less than 2.

Optionally, the processor is further configured to perform at least one of:

applying a first measurement requirement(s), when the terminal supports simultaneously measuring the SSB and the CSI-RS;

applying a second measurement requirement(s), when the terminal does not support simultaneously measuring the SSB and the CSI-RS;

applying a first measurement requirement(s), when the terminal supports independent processing modules to respectively measure the SSB and the CSI-RS;

applying a second measurement requirement(s), when the terminal does not support independent processing modules to respectively measure the SSB and the CSI-RS;

applying a first measurement requirement(s), when the terminal supports the dedicated processing module to measure the CSI-RS; and applying a second measurement requirement(s), when the terminal does not support the dedicated processing module to measure the CSI-RS.

An information acquisition device is further provided in the present disclosure, applied to a terminal and including:

a information acquisition module, configured to acquire fifth information related to a network synchronization.

A terminal is further provided in the present disclosure, including a processor and a transceiver, where the transceiver is configured to receive and transmit data under a control of the processor, the processor is configured to perform:

acquiring fifth information related to a network synchronization.

Optionally, the fifth information includes at least one of: indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

Optionally, the third threshold and/or the fourth threshold is: any value greater than or equal to 0, or a cyclic prefix, or a cyclic prefix/N; where N is an integer greater than or equal to 2.

An information sending device is further provided in the present disclosure, applied to network-side equipment and including:

a sending module, configured to send fifth information related to a network synchronization.

A network-side equipment is further provided in the present disclosure, including a processor and a transceiver, where the transceiver is configured to receive and transmit data under a control of the processor, the processor is configured to perform:

sending fifth information related to a network synchronization.

Optionally, the fifth information includes at least one of: indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

Optionally, the third threshold and/or the fourth threshold is: any value greater than or equal to 0, or a cyclic prefix, or a cyclic prefix/N; where N is an integer greater than or equal to 2.

A communication device is further provided in the present disclosure, including a memory, a processor, and a program stored on the memory and executable on the processor; the processor is configured to execute the program to perform the measurement method hereinabove, or the processor is configured to execute the program to perform the information acquisition method hereinabove, or the processor is configured to execute the program to perform the information sending method hereinabove.

A computer-readable storage medium is further provided in the present disclosure, where a computer program is stored in the computer-readable storage medium, the program is executed by the processor to perform the measurement method hereinabove, or the program is executed by the processor to perform the information acquisition method hereinabove, or the program is executed by the processor to perform the information sending method hereinabove.

The technical scheme of the present disclosure at least has the following beneficial effects:

According to the measurement method, the information acquisition method, the information sending method, the terminal, and the network-side equipment, a plurality of sets of measurement requirement(s) (measurement delay, measurement accuracy and the like) are formulated, the terminal can determine the measurement requirement(s) applied by the terminal based on at least one of information related to the receiving time of a (Channel State Information-Reference Signal) CSI-RS, information related to Fast Fourier Transform (FFT), information related to the measurement of a (Synchronization Signal Block) SSB and the CSI-RS and information related to the minimum interval of the CSI-RS, and different terminals can apply different measurement requirements, so that the measurement performance of each terminal is optimized, and the system performance of a network is improved; and/or the terminal reports at least one of information related to the receiving time of the CSI-RS, information related to Fast Fourier Transform (FFT), information related to the measurement of the SSB and the CSI-RS and information related to the minimum interval of the CSI-RS, so that the network is helped to carry out targeted scheduling or measurement resource allocation, thereby improving the system performance.

BRIEF DESCRIPTION OF THE DRAWINGS

FIG. 1 is a schematic view of a measurement method in an embodiment of the present disclosure;

FIG. 2 is a schematic view of an information acquisition method in an embodiment of the present disclosure;

FIG. 3 is a schematic view of an information sending method in an embodiment of the present disclosure;

FIG. 4 is a schematic view of a measurement device in an embodiment of the present disclosure;

DETAILED DESCRIPTION

Figure 5:
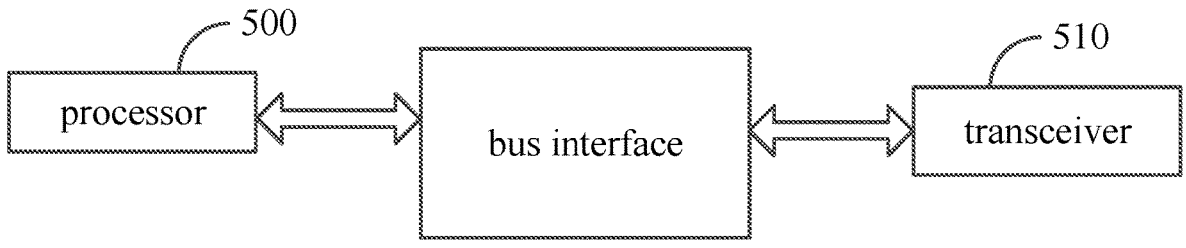
FIG. 5 is a first schematic view of a terminal in an embodiment of the present disclosure.

To make the technical problems, technical solutions and advantages to be solved by the present disclosure clearer, the following detailed description is made with reference to the accompanying drawings and specific embodiments.

As shown in FIG. 1, an embodiment of the present disclosure provides a measurement method, applied to a terminal, including:

Step 11: determining a measurement requirement(s), according to at least one of information related to a receiving time of a Channel State Information-Reference Signal (CSI-RS), information related to a Fast Fourier Transform (FFT), information related to a measurement of a Synchronization Signal Block (SSB) and a CSI-RS and information related to a minimum interval of a CSI-RS.

The embodiment of the disclosure formulates a plurality of sets of measurement requirement(s), which can be applied to different terminals, thereby optimizing the measurement performance of each terminal and improving the system performance of a network.

As an optional embodiment, the method further includes at least one of:

reporting first information, where the first information is information related to the receiving time of the CSI-RS;

reporting second information, where the second information is information related to the FFT;

reporting third information, where the third information is information related to the measurement of the SSB and the CSI-RS; and reporting fourth information, where the fourth information is information related to the minimum interval of the CSI-RS.

When the terminal reports at least one of the first information, the second information, the third information and the fourth information, the network can adopt different scheduling algorithms or measurement resource allocation aiming at the terminals reporting different information, thereby improving the system performance.

It should be noted that, the determination of the measurement requirement(s) and the reporting of the related information by the terminal in the embodiment of the present disclosure are only one optional embodiment; as another optional embodiment, the terminal may also report the related information (i.e., at least one of the first information, the second information, the third information, and the fourth information); as another optional embodiment, the terminal may also determine the measurement requirement(s) only according to the related information (i.e., does not report the related information).

As a preferred embodiment, the information related to the receiving time of the CSI-RS includes at least one of:

whether a receiving time difference or an arriving time difference of the CSI-RS is smaller than or equal to a first threshold;

whether a maximum value of the receiving time difference or the arriving time difference of the CSI-RS is smaller than or equal to a second threshold;

whether the terminal supports a reception or a measurement of a second cell CSI-RS performed based on a timing of a first cell;

whether the terminal supports a reception or a measurement of the CSI-RS performed based on a timing of a third cell;

whether the terminal supports a reception or a measurement of the CSI-RS performed based on a timing of an associated SSB; and whether the terminal supports a reception or a measurement of a CSI-RS of a first frequency point or a first carrier performed based on a single timing.

The receiving time difference or the arriving time difference of the CSI-RS mentioned in the present disclosure refers to a time difference between the CSI-RS and a serving cell, or a time difference between a time point when the CSI-RS of an adjacent cell arrives at the UE and a time point when the CSI-RS of the serving cell arrives at the UE, or a time difference between a time point when the CSI-RS to be measured arrives at the UE and a time point when the CSI-RS of the serving cell arrives at the UE, or a time difference between time points of receiving CSI-RSs by the terminal from different cells, or a time different between time points when the CSI-RSs received by the terminal from different cells arrive, or a time difference between time points of receiving the CSI-RS of the serving cell and receiving the CSI-RS of the adjacent cell by the terminal, or a time difference between time points of receiving CSI-RSs by the terminal from any two cells at a certain frequency point.

The above time difference can also be described as a timing offset, for example, a time offset between the target CSI-RS and the serving cell timing (intra-frequency measurement scenario); or may be a time offset between a certain cell timing and the target CSI-RS (inter-frequency measurement scenario).

The first threshold and/or the second threshold may be as follows: such as X microseconds, may also be indicated by Y symbols/slot, and may also be indicated by cyclic prefix CP, CP/2, MRTD (maximum time difference of reception), deriveSSB-requirement(s) ffromcell (parameter of auxiliary measurement synchronization signal block beam). The embodiment of the disclosure may have information related to the receiving time of the CSI-RS, and different information corresponds to inter-cell data arriving time differences that can be processed by different terminals.

The determination of whether a terminal supports the reception or measurement of the CSI-RS of the second cell based on the timing of the first cell, refers to whether the terminal supports the reception or measurement of the CSI-RS of the neighboring cell based on the timing of the serving cell.

The determination of whether the terminal supports the reception or measurement of the CSI-RS based on the timing of the third cell refers to whether the terminal can perform the reception or measurement of the CSI-RS based on the timing of the neighboring cell; the third cell refers to a cell identified by a cell ID in the CSI-RS configuration.

It should be noted that, if the information related to the receiving time of the CSI-RS reported by the terminal indicates that the receiving time difference of the CSI-RS is smaller than or equal to the first threshold or the maximum value of the receiving time difference of the CSI-RS is smaller than or equal to the second threshold, the terminal may be implicitly indicated to perform reception and/or measurement based on a single FFT module.

In another preferred embodiment, the information related to the FFT includes at least one of:

whether the terminal supports 2 FFTs or more than 2 FFTs;

a quantity of FFTs supported by the terminal.

The number of FFTs refers to a quantity of FFTs supported by the terminal, for example, 4096-point FFTs can be performed on 1 FFT, and 2 4096-point FFTs are supported by the terminal, so that a quantity of FFTs at this time is 2.

It should be noted that, if the terminal does not support 2 FFTs or more, or the number of the FFTs supported by the terminal is 1, the terminal may perform intra-frequency and/or inter-frequency CSI-RS reception and/or measurement based on a single FFT module.

As another preferred embodiment, the information related to measurement of the SSB and CSI-RS includes at least one of:

whether the terminal supports simultaneously measuring the SSB and the CSI-RS;

whether the terminal supports independent processing modules to respectively measure the SSB and the CSI-RS;

whether the terminal supports a dedicated processing module to measure the CSI-RS.

As another preferred embodiment, the information related to the minimum interval of the CSI-RS includes at least one of:

a quantity of symbols spaced between CSI-RS resources of two consecutive slots;

a quantity of slots spaced between two consecutive slots in which the CSI-RS is transmitted.

The "a quantity of symbols spaced between CSI-RS resources of two consecutive slots" includes: a quantity of symbols spaced between the last CSI-RS resource of the first slot in the two consecutive slots and the first CSI-RS resource of the second slot in the two consecutive slots.

In an embodiment of the present disclosure, the measurement requirement(s) includes: measurement time and/or measurement accuracy. The embodiment of the disclosure provides at least two measurement requirements, namely a first measurement requirement(s) and a second measurement requirement(s). The first measurement requirement(s) is better than the second measurement requirement(s), e.g. the measurement time is shorter and/or the measurement accuracy is better and/or the range of channel quality (received energy to interference noise ratio) to which the measurement accuracy is applied is wider and/or the range of channel quality (received energy to interference noise ratio) to which the measurement time is applied is wider.

For example, the first measurement requirement(s) may be:

max (T1, N1×K1×T2)×S1, and/or max (T1, N1×K1×max (T2, T3))×S, and/or N1×K1×T3×S1, and/or max (T1, N1×max (T4, T2))×S1, and/or max (T1, N1×max (T4, T2, T3))−S1, and/or N1×max (T4, T3))−S1. Where T1 is a first time period (some fixed time period); n1 is a non-zero positive number, K1 is a factor related to the CSI-RS period and the measurement gap period MGRP; t2 is the CSI-RS period; t3 is DRX cycle; t4 is the measurement gap period MGRP; the intra-frequency scene, S1 is a factor related to the number of carriers aggregated by carriers, the inter-frequency scene, and S1 is a factor related to the number of frequency points.

For another example, the second measurement requirement(s) may be:

max (T1_2, N1_2 x K1_2×T2_2)×51_2, and/or max (T1_2, N1_2×K1_2×max (T2_2, T3_2)). S3_2, and/or N3_2×K3_2×T3_2×S3_2, and/or max (T3_2, N3_2×max (T3_2, T3_2×S3_2), and/or max (T3_2, N3_2×max (T3_2, T3_2) S3_2, and/or N3_2×3_2, T3_2×(T3_2, S3_2×) S3_2) and/2 and/or N3 x 3_2 x 2, T3_2 x (T3_2, S3 2). Where T1_2 is a first time length (some fixed time length); n1_2 is a non-zero positive number, K1_2 is a factor related to the CSI-RS period and the measurement gap period MGRP; t2_2 is the CSI-RS period; t3_2 is a DRX cycle; t4_2 is the measurement gap period MGRP; the intra-frequency scenario, S1_2, is a factor related to the number of carriers aggregated by carriers, and the inter-frequency scenario, S1_2, is a factor related to the number of frequency points.

It should be noted that at least one parameter of the first measurement requirement(s) is different from that of the second measurement requirement(s).

As an optional embodiment, the method includes at least one of:

applying a first measurement requirement(s), when the receiving time difference or the arriving time difference of the CSI-RS is smaller than or equal to a first threshold;

applying a second measurement requirement(s), when the receiving time difference or the arriving time difference of the CSI-RS is larger than or equal to a first threshold;

applying a first measurement requirement(s), when the maximum value of the receiving time difference or the arriving time difference of the CSI-RS is smaller than or equal to a second threshold;

applying a second measurement requirement(s), when the maximum value of the receiving time difference or the arriving time difference of the CSI-RS is larger than a second threshold;

applying a first measurement requirement(s), when the terminal supports the reception or the measurement of the second cell CSI-RS performed based on the timing of the first cell;

applying a second measurement requirement(s), when the terminal does not support the reception or the measurement of the second cell CSI-RS performed based on the timing of the first cell;

applying a first measurement requirement(s), when the terminal supports the reception or the measurement of the CSI-RS performed based on the timing of the third cell;

applying a second measurement requirement(s), when the terminal does not support the reception or the measurement of the CSI-RS performed based on the timing of the third cell;

applying a first measurement requirement(s), when the terminal supports the reception or the measurement of the CSI-RS performed based on the timing of the associated SSB;

applying a second measurement requirement(s), when the terminal does not support the reception or the measurement of the CSI-RS performed based on the timing of the associated SSB;

applying a first measurement requirement(s), when the terminal supports the reception or the measurement of the CSI-RS of the first frequency point or the first carrier performed based on the single timing; and applying a second measurement requirement(s), when the terminal does not support the reception or the measurement of the CSI-RS of the first frequency point or the first carrier performed based on the single timing.

As another optional, the method includes at least one of:

applying a first measurement requirement(s), when the terminal supports 2 FFTs or more than 2 FFTs;

applying a second measurement requirement(s), when the terminal does not support 2 FFTs or more than 2 FFTs;

applying a first measurement requirement(s), when a quantity of FFTs supported by the terminal is greater than or equal to 2; and applying a second measurement requirement(s), when a quantity of FFTs supported by the terminal is less than 2.

As yet another optional embodiment, the method includes at least one of:

applying a first measurement requirement(s), when the terminal supports simultaneously measuring the SSB and the CSI-RS;

applying a second measurement requirement(s), when the terminal does not support simultaneously measuring the SSB and the CSI-RS;

applying a first measurement requirement(s), when the terminal supports independent processing modules to respectively measure the SSB and the CSI-RS;

applying a second measurement requirement(s), when the terminal does not support independent processing modules to respectively measure the SSB and the CSI-RS;

applying a first measurement requirement(s), when the terminal supports the dedicated processing module to measure the CSI-RS; and applying a second measurement requirement(s), when the terminal does not support the dedicated processing module to measure the CSI-RS.

In summary, a plurality of sets of measurement requirement(s) (measurement delay, measurement accuracy and the like) are formulated, the terminal can determine the measurement requirement(s) applied by the terminal based on at least one of information related to the receiving time of a (Channel State Information-Reference Signal) CSI-RS, information related to Fast Fourier Transform (FFT), information related to the measurement of a (Synchronization Signal Block) SSB and the CSI-RS and information related to the minimum interval of the CSI-RS, and different terminals can apply different measurement requirement(s), so that the measurement performance of each terminal is optimized, and the system performance of a network is improved; and/or the terminal reports at least one of information related to the receiving time of the CSI-RS, information related to Fast Fourier Transform (FFT), information related to the measurement of the SSB and the CSI-RS and information related to the minimum interval of the CSI-RS, so that the network is helped to carry out targeted scheduling or measurement resource allocation, thereby improving the system performance.

In order to more clearly describe the measurement method provided by the embodiment of the present disclosure, the following description is made with reference to several examples.

Example One

The network issues a first threshold and/or a second threshold that the terminal can use to evaluate which set of measurement requirement(s) is used (this step is optional, if the protocol has previously been specified in relation to it, the network may not issue the threshold).

The terminal determines the adopted measurement requirement(s) based on the threshold and/or the data arriving time difference.

In this example, since the network does not have the capability information of the terminal (i.e., at least one of the first information, the second information, the third information, and the fourth information), the network may consider that all terminals in the network use a certain set of the same measurement requirement(s), and therefore the terminal autonomously selects the measurement requirement(s) to be used in this example.

Example Two

The terminal reports time differences (namely the receiving time differences of CSI-RS) of data from different cells which can be processed simultaneously;

the network issues a first threshold and/or a second threshold that the terminal can use to evaluate which set of measurement performance indicators to use (this step is optional, if the protocol has previously been specified in relation to it, the network may not issue the threshold).

The terminal determines the adopted measurement requirement(s) according to the data reaching time difference and the threshold (optional).

In this example, since the network knows the terminal capabilities (i.e., the receiving time difference of the CSI-RS), the network can predict the measurement behavior of the terminals with different capabilities, thereby achieving better scheduling.

Example Three

The terminal reports FFT capability;

the network issues an FFT threshold, and the terminal can evaluate which set of adopted measurement requirement(s) by using the threshold (the step is optional, if the protocol has relevant provisions in advance, the network cannot issue the threshold);

the terminal determines the adopted measurement requirement(s) according to the FFT capability and the FFT threshold (optional).

Example Four

The terminal reports whether simultaneous processing or parallel processing of SSB measurement and CSI-RS measurement is supported (the step can be selected, and the terminal does not report);

if the terminal supports simultaneous processing or parallel processing of SSB measurement and CSI-RS measurement, the calculation of CSSF (measurement resource allocation) distinguishes the SSB and the CSI-RS, and the calculation is respectively carried out independently, namely the CSSFSSB is applied to the measurement requirement(s) of the SSB, and the CSSFCSI-RS is applied to the measurement requirement(s) of the CSI-RS; if the terminal does not support simultaneous processing of the SSB measurement and the CSI-RS measurement, or the terminal can only process the SSB measurement and the CSI-RS measurement in series, the SSB frequency point and the CSI-RS frequency point are both considered in the CSSF calculation, that is, the CSSF is shared by the SSB measurement requirement(s) and the CSI-RS measurement requirement(s) for use.

Example Five

The terminal reports whether simultaneous processing or parallel processing of SSB measurement and CSI-RS measurement is supported (the step can be selected, and the terminal does not report);

if the terminal supports simultaneous processing or parallel processing of SSB measurement and CSI-RS measurement, the calculation of CSSF distinguishes SSB and CSI-RS, and the SSB and the CSI-RS are respectively and independently performed, where the CSI-RS can adopt different CSSF calculation modes according to whether associatedSSB (related SSB) is configured or not, and the CSSFCSI-RS is applied to measurement requirement(s) of the CSI-RS without associatedSSB; CSSFSSB_CSI-RS is applied to measurement requirement(s) of SSB and CSI-RS with associatedSSB. If the terminal does not support simultaneous processing of the SSB measurement and the CSI-RS measurement, or the terminal can only process the SSB measurement and the CSI-RS measurement in series, the SSB frequency point and the CSI-RS frequency point are both considered in the CSSF calculation, that is, the CSSF is shared by the SSB measurement requirement(s) and the CSI-RS measurement requirement(s) for use.

As shown in FIG. 2, an embodiment of the present disclosure further provides an information acquisition method, applied to a terminal, including:

Step 21: acquiring fifth information related to a network synchronization.

The terminal receives the fifth information, and the terminal may perform CSI-RS measurement on the CSI-RS based on a single FFT.

As an optional embodiment, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

As an embodiment, the network only issues indication information indicating whether the network or cells are synchronized, for example, 1 bit, where a bit 1 indicates synchronization; as another example, the configuration as true (enabled) by the corresponding IE indicates synchronization. Further, the network issues indication information indicating whether the network or the cells are synchronized implicitly to indicate that the synchronization error or the synchronization accuracy between the cells is smaller than a second threshold and/or the sum of the synchronization error or the synchronization accuracy between the cells and the transmission delay difference is smaller than a third threshold. The terminal receives the indication information indicating whether the network or the cells are synchronous, and then the synchronization error or the synchronization accuracy between the cells can be obtained.

The third threshold and/or the fourth threshold are: any value greater than or equal to 0, or cyclic prefix/N; where N is an integer greater than or equal to 2.

For example, if the network enables the fifth message, it indicates that the synchronization error between the base stations is below A us, or smaller than CP/N. The terminals under the network can all receive data based on a single FFT. Or, for example, if the network enables the fifth information, it indicates that the synchronization error+propagation delay difference between the base stations is lower than B us, or smaller than CP/N. The terminals under the network can all receive data based on a single FFT. A and B are preset threshold values.

In summary, in the embodiment of the present disclosure, the terminal can improve the measurement accuracy according to the network indication, according to the information related to the network synchronization indicated by the network.

As shown in FIG. 3, an embodiment of the present disclosure further provides an information sending method, applied to a network-side equipment, including:

Step 31: sending fifth information related to a network synchronization, where the terminal receives the fifth information, and the terminal may perform CSI-RS measurement on the CSI-RS based on a single FFT.

As an optional embodiment, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

As an embodiment, the network only issues indication information indicating whether the network or cells are synchronized, for example, 1 bit, where a bit 1 indicates synchronization; as another example, the configuration as true (enabled) by the corresponding IE indicates synchronization. Further, the network issues indication information indicating whether the network or the cells are synchronized implicitly to indicate that the synchronization error or the synchronization accuracy between the cells is smaller than a second threshold and/or the sum of the synchronization error or the synchronization accuracy between the cells and the transmission delay difference is smaller than a third threshold. The terminal receives the indication information indicating whether the network or the cells are synchronous, and then the synchronization error or the synchronization accuracy between the cells can be obtained.

The third threshold and/or the fourth threshold are: any value greater than or equal to 0, or cyclic prefix/N; where N is an integer greater than or equal to 2.

For example, if the network enables the fifth message, it indicates that the synchronization error between the base stations is below A us, or smaller than CP/N. The terminals under the network can all receive data based on a single FFT. Or, for example, if the network enables the fifth information, it indicates that the synchronization error+propagation delay difference between the base stations is lower than B us, or smaller than CP/N. The terminals under the network can all receive data based on a single FFT. A and B are preset threshold values.

In summary, in the embodiment of the present disclosure, the terminal can improve the measurement accuracy according to the network indication according to the information related to the network synchronization indicated by the network.

As shown in FIG. 4, an embodiment of the present disclosure further provides a measurement device, which is applied to a terminal, and includes:

a measurement determining module 41, configured to determine a measurement requirement(s), according to at least one of information related to a receiving time of a Channel State Information-Reference Signal (CSI-RS), information related to a Fast Fourier Transform (FFT), information related to a measurement of a Synchronization Signal Block (SSB) and a CSI-RS and information related to a minimum interval of a CSI-RS.

Optionally, the measurement device further including at least one of:

a first reporting module, configured to report first information, where the first information is information related to the receiving time of the CSI-RS;

a second reporting module, configured to report second information, where the second information is information related to the FFT;

a third reporting module, configured to report third information, where the third information is information related to the measurement of the SSB and the CSI-RS; and a fourth reporting module, configured to report fourth information, where the fourth information is information related to the minimum interval of the CSI-RS.

Optionally, the information related to the receiving time of the CSI-RS includes at least one of:

whether a receiving time difference or an arriving time difference of the CSI-RS is smaller than or equal to a first threshold;

whether a maximum value of the receiving time difference or the arriving time difference of the CSI-RS is smaller than or equal to a second threshold;

whether the terminal supports a reception or a measurement of a second cell CSI-RS performed based on a timing of a first cell;

whether the terminal supports a reception or a measurement of the CSI-RS performed based on a timing of a third cell;

whether the terminal supports a reception or a measurement of the CSI-RS performed based on a timing of an associated SSB; and whether the terminal supports a reception or a measurement of a CSI-RS of a first frequency point or a first carrier performed based on a single timing.

Optionally, the information related to the FFT includes at least one of:

whether the terminal supports 2 FFTs or more than 2 FFTs;

a quantity of FFTs supported by the terminal.

Optionally, the information related to the measurement of the SSB and the CSI-RS includes at least one of:

whether the terminal supports simultaneously measuring the SSB and the CSI-RS;

whether the terminal supports independent processing modules to respectively measure the SSB and the CSI-RS;

whether the terminal supports a dedicated processing module to measure the CSI-RS.

Optionally, the information related to the minimum interval of the CSI-RS includes at least one of:

a quantity of symbols spaced between CSI-RS resources of two consecutive slots;

a quantity of slots spaced between two consecutive slots in which the CSI-RS is transmitted.

Optionally, the measurement device further includes a first application module configured to:

apply a first measurement requirement(s), when the receiving time difference or the arriving time difference of the CSI-RS is smaller than or equal to a first threshold; or apply a second measurement requirement(s), when the receiving time difference or the arriving time difference of the CSI-RS is larger than or equal to a first threshold; or apply a first measurement requirement(s), when the maximum value of the receiving time difference or the arriving time difference of the CSI-RS is smaller than or equal to a second threshold; or apply a second measurement requirement(s), when the maximum value of the receiving time difference or the arriving time difference of the CSI-RS is larger than a second threshold; or apply a first measurement requirement(s), when the terminal supports the reception or the measurement of the second cell CSI-RS performed based on the timing of the first cell; or apply a second measurement requirement(s), when the terminal does not support the reception or the measurement of the second cell CSI-RS performed based on the timing of the first cell; or apply a first measurement requirement(s), when the terminal supports the reception or the measurement of the CSI-RS performed based on the timing of the third cell; or apply a second measurement requirement(s), when the terminal does not support the reception or the measurement of the CSI-RS performed based on the timing of the third cell; or apply a first measurement requirement(s), when the terminal supports the reception or the measurement of the CSI-RS performed based on the timing of the associated SSB; or apply a second measurement requirement(s), when the terminal does not support the reception or the measurement of the CSI-RS performed based on the timing of the associated SSB; or apply a first measurement requirement(s), when the terminal supports the reception or the measurement of the CSI-RS of the first frequency point or the first carrier performed based on the single timing; or applying a second measurement requirement(s), when the terminal does not support the reception or the measurement of the CSI-RS of the first frequency point or the first carrier performed based on the single timing.

Optionally, the measurement device further includes a second application module configured to:

apply a first measurement requirement(s), when the terminal supports 2 FFTs or more than 2 FFTs; or apply a second measurement requirement(s), when the terminal does not support 2 FFTs or more than 2 FFTs; or apply a first measurement requirement(s), when a quantity of FFTs supported by the terminal is greater than or equal to 2; or apply a second measurement requirement(s), when a quantity of FFTs supported by the terminal is less than 2.

Optionally, the measurement device further includes a third application module configured to:

apply a first measurement requirement(s), when the terminal supports simultaneously measuring the SSB and the CSI-RS; or apply a second measurement requirement(s), when the terminal does not support simultaneously measuring the SSB and the CSI-RS; or apply a first measurement requirement(s), when the terminal supports independent processing modules to respectively measure the SSB and the CSI-RS; or apply a second measurement requirement(s), when the terminal does not support independent processing modules to respectively measure the SSB and the CSI-RS; or apply a first measurement requirement(s), when the terminal supports the dedicated processing module to measure the CSI-RS; or apply a second measurement requirement(s), when the terminal does not support the dedicated processing module to measure the CSI-RS.

The method includes the steps that a plurality of sets of measurement requirement(s) (measurement time delay, measurement accuracy and the like) are formulated, a terminal can determine the measurement requirement(s) applied by the terminal based on at least one of information related to the receiving time of a Channel State Information-Reference Signal (CSI-RS), information related to Fast Fourier Transform (FFT), information related to the measurement of a Synchronous Signal Block (SSB) and the CSI-RS and information related to the minimum interval of the CSI-RS, and different terminals can apply different measurement requirement(s), so that the measurement performance of each terminal is optimized, and the system performance of a network is improved; and/or the terminal reports at least one of information related to the receiving time of the CSI-RS, information related to Fast Fourier Transform (FFT), information related to the measurement of the SSB and the CSI-RS and information related to the minimum interval of the CSI-RS, so that the network is helped to carry out targeted scheduling or measurement resource allocation, and the system performance is improved.

It should be noted that, the measurement apparatus provided in the embodiments of the present disclosure is an apparatus capable of performing the measurement method, and all embodiments of the measurement method are applicable to the apparatus and can achieve the same or similar beneficial effects.

As shown in FIG. 5, an embodiment of the present disclosure further provides a terminal, which includes a processor 500 and a transceiver 510, where the transceiver 510 is configured to receive and transmit data under a control of the processor 500, the processor 500 is configured to perform:

determining a measurement requirement(s), according to at least one of information related to a receiving time of a Channel State Information-Reference Signal (CSI-RS), information related to a Fast Fourier Transform (FFT), information related to a measurement of a Synchronization Signal Block (SSB) and a CSI-RS and information related to a minimum interval of a CSI-RS.

Optionally, the processor 500 is further configured to perform at least one of:

reporting first information, where the first information is information related to the receiving time of the CSI-RS;

reporting second information, where the second information is information related to the FFT;

reporting third information, where the third information is information related to the measurement of the SSB and the CSI-RS; and reporting fourth information, where the fourth information is information related to the minimum interval of the CSI-RS.

Optionally, the information related to the receiving time of the CSI-RS includes at least one of:

whether a receiving time difference or an arriving time difference of the CSI-RS is smaller than or equal to a first threshold;

whether a maximum value of the receiving time difference or the arriving time difference of the CSI-RS is smaller than or equal to a second threshold;

whether the terminal supports a reception or a measurement of a second cell CSI-RS performed based on a timing of a first cell;

whether the terminal supports a reception or a measurement of the CSI-RS performed based on a timing of a third cell;

whether the terminal supports a reception or a measurement of the CSI-RS performed based on a timing of an associated SSB; and whether the terminal supports a reception or a measurement of a CSI-RS of a first frequency point or a first carrier performed based on a single timing.

Optionally, the information related to the FFT includes at least one of:

whether the terminal supports 2 FFTs or more than 2 FFTs;

a quantity of FFTs supported by the terminal.

Optionally, the information related to the measurement of the SSB and the CSI-RS includes at least one of:

whether the terminal supports simultaneously measuring the SSB and the CSI-RS;

whether the terminal supports independent processing modules to respectively measure the SSB and the CSI-RS;

whether the terminal supports a dedicated processing module to measure the CSI-RS.

Optionally, the information related to the minimum interval of the CSI-RS includes at least one of:

a quantity of symbols spaced between CSI-RS resources of two consecutive slots;

a quantity of slots spaced between two consecutive slots in which the CSI-RS is transmitted.

Optionally, the processor 500 is further configured to perform at least one of:

applying a first measurement requirement(s), when the receiving time difference or the arriving time difference of the CSI-RS is smaller than or equal to a first threshold;

applying a second measurement requirement(s), when the receiving time difference or the arriving time difference of the CSI-RS is larger than or equal to a first threshold;

applying a first measurement requirement(s), when the maximum value of the receiving time difference or the arriving time difference of the CSI-RS is smaller than or equal to a second threshold;

applying a second measurement requirement(s), when the maximum value of the receiving time difference or the arriving time difference of the CSI-RS is larger than a second threshold;

applying a first measurement requirement(s), when the terminal supports the reception or the measurement of the second cell CSI-RS performed based on the timing of the first cell;

applying a second measurement requirement(s), when the terminal does not support the reception or the measurement of the second cell CSI-RS performed based on the timing of the first cell;

applying a first measurement requirement(s), when the terminal supports the reception or the measurement of the CSI-RS performed based on the timing of the third cell;

applying a second measurement requirement(s), when the terminal does not support the reception or the measurement of the CSI-RS performed based on the timing of the third cell;

applying a first measurement requirement(s), when the terminal supports the reception or the measurement of the CSI-RS performed based on the timing of the associated SSB;

applying a second measurement requirement(s), when the terminal does not support the reception or the measurement of the CSI-RS performed based on the timing of the associated SSB;

applying a first measurement requirement(s), when the terminal supports the reception or the measurement of the CSI-RS of the first frequency point or the first carrier performed based on the single timing; and applying a second measurement requirement(s), when the terminal does not support the reception or the measurement of the CSI-RS of the first frequency point or the first carrier performed based on the single timing.

Optionally, the processor 500 is further configured to perform at least one of:

applying a first measurement requirement(s), when the terminal supports 2 FFTs or more than 2 FFTs;

applying a second measurement requirement(s), when the terminal does not support 2 FFTs or more than 2 FFTs;

applying a first measurement requirement(s), when a quantity of FFTs supported by the terminal is greater than or equal to 2; and applying a second measurement requirement(s), when a quantity of FFTs supported by the terminal is less than 2.

Optionally, the processor 500 is further configured to perform at least one of:

applying a first measurement requirement(s), when the terminal supports simultaneously measuring the SSB and the CSI-RS;

applying a second measurement requirement(s), when the terminal does not support simultaneously measuring the SSB and the CSI-RS;

applying a first measurement requirement(s), when the terminal supports independent processing modules to respectively measure the SSB and the CSI-RS;

applying a second measurement requirement(s), when the terminal does not support independent processing modules to respectively measure the SSB and the CSI-RS;

applying a first measurement requirement(s), when the terminal supports the dedicated processing module to measure the CSI-RS; and applying a second measurement requirement(s), when the terminal does not support the dedicated processing module to measure the CSI-RS.

The method includes the steps that a plurality of sets of measurement requirement(s) (measurement time delay, measurement accuracy and the like) are formulated, a terminal can determine the measurement requirement(s) applied by the terminal based on at least one of information related to the receiving time of a Channel State Information-Reference Signal (CSI-RS), information related to Fast Fourier Transform (FFT), information related to the measurement of a Synchronous Signal Block (SSB) and the CSI-RS and information related to the minimum interval of the CSI-RS, and different terminals can apply different measurement requirement(s), so that the measurement performance of each terminal is optimized, and the system performance of a network is improved; and/or the terminal reports at least one of information related to the receiving time of the CSI-RS, information related to Fast Fourier Transform (FFT), information related to the measurement of the SSB and the CSI-RS and information related to the minimum interval of the CSI-RS, so that the network is helped to carry out targeted scheduling or measurement resource allocation, and the system performance is improved.

It should be noted that, in the terminal capable of executing the measurement method provided in the embodiment of the present disclosure, all embodiments of the measurement method are applicable to the terminal, and can achieve the same or similar beneficial effects.

Figure 6:
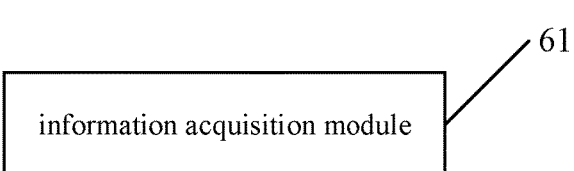
FIG. 6 is a schematic view of an information acquisition device in an embodiment of the present disclosure.

As shown in FIG. 6, an embodiment of the present disclosure further provides an information acquisition device, which is applied to a terminal, and includes:

a information acquisition module 61, configured to acquire fifth information related to a network synchronization.

As an optional embodiment, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

As an optional embodiment, the third threshold and/or the fourth threshold is: any value greater than or equal to 0, or a cyclic prefix, or a cyclic prefix/N; where N is an integer greater than or equal to 2.

According to the information related to network synchronization and indicated by the network, the terminal can improve the measurement accuracy according to the network indication.

It should be noted that, the information acquiring apparatus provided in the embodiments of the present disclosure is an apparatus capable of executing the information acquiring method, and all embodiments of the information acquiring method are applicable to the apparatus and can achieve the same or similar beneficial effects.

Figure 7:
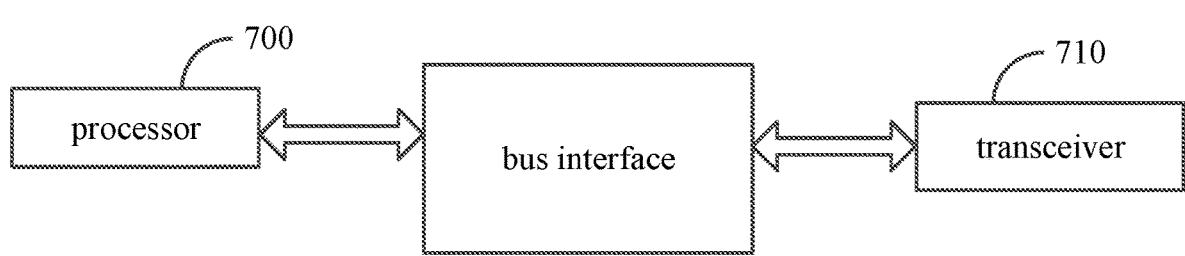
FIG. 7 is a second schematic view of a terminal in an embodiment of the present disclosure.

As shown in FIG. 7, an embodiment of the present disclosure further provides a terminal, including a processor 700 and a transceiver 710, where the transceiver 710 is configured to receive and transmit data under a control of the processor 700, and the processor 700 is configured to perform:

acquiring fifth information related to a network synchronization.

As an optional embodiment, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

As an optional embodiment, the third threshold and/or the fourth threshold is: any value greater than or equal to 0, or a cyclic prefix, or a cyclic prefix/N; where N is an integer greater than or equal to 2.

According to the information related to network synchronization and indicated by the network, the terminal can improve the measurement accuracy according to the network indication.

It should be noted that, the terminal provided in the embodiment of the present disclosure is a terminal capable of executing the information acquisition method, and all embodiments of the information acquisition method are applicable to the terminal and can achieve the same or similar beneficial effects.

Figure 8:
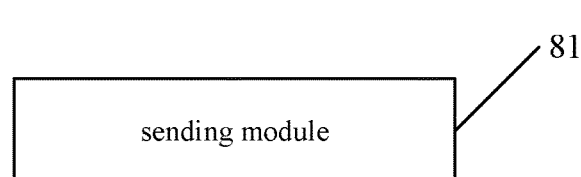
FIG. 8 is a schematic view of an information sending device in an embodiment of the present disclosure.

As shown in FIG. 8, an embodiment of the present disclosure further provides an information sending device, applied to a network device, including:

a sending module 81, configured to send fifth information related to a network synchronization.

As an optional embodiment, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

As an optional embodiment, the third threshold and/or the fourth threshold is: any value greater than or equal to 0, or a cyclic prefix, or a cyclic prefix/N; where N is an integer greater than or equal to 2.

According to the information related to network synchronization and indicated by the network, the terminal can improve the measurement accuracy according to the network indication.

It should be noted that, the information sending apparatus provided in the embodiments of the present disclosure is an apparatus capable of executing the above information sending method, and all embodiments of the above information sending method are applicable to the apparatus and can achieve the same or similar beneficial effects.

Figure 9:
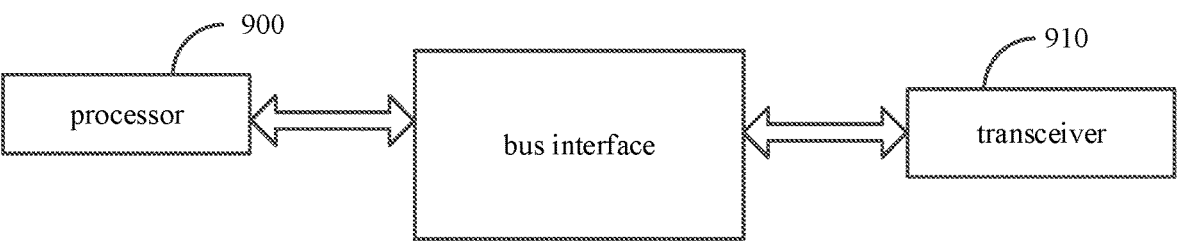
FIG. 9 is a schematic view of a network-side equipment in an embodiment of the present disclosure.

As shown in FIG. 9, an embodiment of the present disclosure further provides a network-side equipment, including a processor 900 and a transceiver 910, where the transceiver 910 receives and transmits data under the control of the processor 900, and the processor 900 is configured to perform:

sending fifth information related to a network synchronization.

As an optional embodiment, the fifth information includes at least one of:

indication information indicating whether a cell or a network is synchronized;

a synchronization error or a synchronization accuracy between cells being smaller than a third threshold; and a sum of a synchronization error or a synchronization accuracy and a transmission delay difference between cells being smaller than a fourth threshold.

As an optional embodiment, the third threshold and/or the fourth threshold is: any value greater than or equal to 0, or a cyclic prefix, or a cyclic prefix/N; where N is an integer greater than or equal to 2.

According to the information related to network synchronization and indicated by the network, the terminal can improve the measurement accuracy according to the network indication.

It should be noted that, the network-side equipment provided in the embodiment of the present disclosure is a network-side equipment capable of executing the information sending method, and all embodiments of the information sending method are applicable to the network-side equipment and can achieve the same or similar beneficial effects.

An embodiment of the present disclosure further provides a communication device, including a memory, a processor, and a program stored on the memory and executable on the processor; the processor is configured to execute the program to perform the measurement method or the information acquisition method or the information sending method, and can achieve the same technical effect, and details are not repeated here to avoid repetition.

The embodiments of the present disclosure further provide a computer-readable storage medium, on which a computer program is stored, where the computer program, when executed by a processor, implements the processes in the perform the measurement method or the information acquisition method or the information sending method, and can achieve the same technical effects, and in order to avoid repetition, the computer program is not described herein again. The computer-readable storage medium may be a Read-Only Memory (ROM), a Random Access Memory (RAM), a magnetic disk or an optical disk.

As will be appreciated by one skilled in the art, embodiments of the present disclosure may be provided as a method, system, or computer program product. Accordingly, the present disclosure may take the form of an entirely hardware embodiment, an entirely software embodiment or an embodiment combining software and hardware aspects. Furthermore, the present disclosure may take the form of a computer program product embodied on one or more computer-readable storage media (including, but not limited to, disk storage, optical storage, and the like) having computer-usable program code embodied therein.

The present disclosure is described with reference to flowchart illustrations and/or block diagrams of methods, apparatus (systems) and computer program products according to embodiments of the application. It will be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart flow or flows and/or block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function specified in the flowchart flow or flows and/or block diagram block or blocks.

These computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

It should be noted that the division of each module is only a logical division, and all or part of the actual implementation may be integrated into one physical entity or may be physically separated. And these modules can all be implemented in the form of software invoked by a processing element; or can be implemented in the form of hardware; and part of the modules can be realized in the form of calling software by the processing element, and part of the modules can be realized in the form of hardware. For example, the determining module may be a processing element separately set up, or may be integrated into a chip of the apparatus, or may be stored in a memory of the apparatus in the form of program code, and a processing element of the apparatus calls and executes the function of the determining module. The other modules are implemented similarly. In addition, all or part of the modules can be integrated together or can be independently realized. The processing element described herein may be an integrated circuit having signal processing capabilities. In implementation, each step of the above method or each module above may be implemented by an integrated logic circuit of hardware in a processor element or an instruction in the form of software.

For example, the various modules, units, sub-units or sub-modules may be one or more integrated circuits configured to implement the above methods, such as: one or more Application Specific Integrated Circuits (ASICs), or one or more microprocessors (DSPs), or one or more Field Programmable Gate Arrays (FPGAs), among others. For another example, when some of the above modules are implemented in the form of a Processing element scheduler code, the Processing element may be a general-purpose processor, such as a Central Processing Unit (CPU) or other processor that can call the program code. As another example, these modules may be integrated together and implemented in the form of a system-on-a-chip (SOC).

The terms "first," "second," and the like in the description and in the claims of the present disclosure are used for distinguishing between similar elements and not necessarily for describing a particular sequential or chronological order. It is to be understood that the data so used may be interchanged under appropriate circumstances such that embodiments of the disclosure described herein may be implemented, for example, in sequences other than those illustrated or described herein. Moreover, the terms "includes," "including," and "having," and any variations thereof, are intended to cover a non-exclusive inclusion, such that a process, method, system, article, or apparatus that includes a list of steps or elements is not necessarily limited to those steps or elements expressly listed, but may include other steps or elements not expressly listed or inherent to such process, method, article, or apparatus. Further, the use of "and/or" in the specification and claims means that at least one of the connected objects, such as a and/or B and/or C, means that 7 cases are included that include a alone, B alone, C alone, and both a and B, B and C, a and C, and A, B and C. Similarly, the use of "at least one of A and B" in the specification and claims is to be understood as "A alone, B alone, or both A and B present".

While the foregoing is directed to optional embodiments of the present disclosure, it will be appreciated by those skilled in the art that various changes and modifications may be made therein without departing from the principles of the disclosure, and it is intended that such changes and modifications be covered by the scope of the disclosure.

What is claimed is:

1. A measurement method, applied to a user equipment (UE) and comprising:

performing measurement by the UE, wherein the measurement meets measurement requirements, and the measurement requirements are determined according to information related to a receiving time of a Channel State Information-Reference Signal (CSI-RS);

wherein the information related to a receiving time of the CSI-RS is timing offset between CSI-RS and serving cell timing, or the information related to a receiving time of the CSI-RS comprises timing offset between CSI-RS and serving cell timing;

wherein the measurement requirements comprise accuracy requirements, or the measurement requirements are accuracy requirements.

2. The method according to claim 1, further comprising:

reporting first information, wherein the first information is information related to the receiving time of the CSI-RS.

3. The method according to claim 1, wherein the timing offset between CSI-RS and serving cell timing is smaller than or equal to a first threshold; and/or a maximum value of the timing offset between CSI-RS and serving cell timing is smaller than or equal to a second threshold;

or the information related to the receiving time of the CSI-RS further comprises at least one of:

whether the UE supports a reception or a measurement of a second cell CSI-RS performed based on a timing of a first cell;

whether the UE supports a reception or a measurement of the CSI-RS performed based on a timing of a third cell;

whether the UE supports a reception or a measurement of the CSI-RS performed based on a timing of an associated SSB; and whether the UE supports a reception or a measurement of a CSI-RS of a first frequency point or a first carrier performed based on a single timing.

4. The method according to claim 3, wherein the method further comprises at least one of:

applying first measurement requirements, when the timing offset between CSI-RS and serving cell timing is smaller than or equal to a first threshold;

applying second measurement requirements, when the timing offset between CSI-RS and serving cell timing is larger than or equal to a first threshold;

applying first measurement requirements, when the maximum value of the timing offset between CSI-RS and serving cell timing is smaller than or equal to a second threshold;

applying second measurement requirements, when the maximum value of the timing offset between CSI-RS and serving cell timing is larger than a second threshold.

5. A user equipment (UE), comprising a processor and a transceiver, wherein the transceiver is configured to receive and transmit data under a control of the processor, the processor is configured to perform the measurement method according to claim 1.

6. The UE according to claim 5, wherein the processor is further configured to perform reporting first information, wherein the first information is information related to the receiving time of the CSI-RS.

7. The UE according to claim 5, wherein the timing offset between CSI-RS and serving cell timing is smaller than or equal to a first threshold; and/or a maximum value of the timing offset between CSI-RS and serving cell timing is smaller than or equal to a second threshold;

or the information related to the receiving time of the CSI-RS further comprises at least one of:

whether the UE supports a reception or a measurement of a second cell CSI-RS performed based on a timing of a first cell;

whether the UE supports a reception or a measurement of the CSI-RS performed based on a timing of a third cell;

whether the UE supports a reception or a measurement of the CSI-RS performed based on a timing of an associated SSB; and whether the UE supports a reception or a measurement of a CSI-RS of a first frequency point or a first carrier performed based on a single timing.

* * * * *